(12) United States Patent
Riley et al.

(10) Patent No.: US 8,837,073 B2
(45) Date of Patent: Sep. 16, 2014

(54) DELAYED DISK DRIVE PREAMPLIFIER WRITE TURN ON

(75) Inventors: Dale Thomas Riley, Longmont, CO (US); Matthew Ian Robinson, Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 143 days.

(21) Appl. No.: 13/426,320

(22) Filed: Mar. 21, 2012

(65) Prior Publication Data

US 2013/0250450 A1    Sep. 26, 2013

(51) Int. Cl.
*G11B 21/02* (2006.01)

(52) U.S. Cl.
USPC ............................................................ 360/68

(58) Field of Classification Search
None
See application file for complete search history.

(56) References Cited

U.S. PATENT DOCUMENTS

| | | | | |
|---|---|---|---|---|
| 4,791,615 A | * | 12/1988 | Pelley et al. | 714/711 |
| 4,858,030 A | * | 8/1989 | Oku et al. | 386/206 |
| 5,227,930 A | * | 7/1993 | Thanos et al. | 360/78.04 |
| 6,954,321 B2 | | 10/2005 | Freitas et al. | |
| 7,027,251 B1 | * | 4/2006 | Darragh et al. | 360/75 |
| 7,133,234 B2 | | 11/2006 | Bloodworth et al. | |
| 7,133,239 B1 | * | 11/2006 | Hartman et al. | 360/75 |
| 7,603,530 B1 | * | 10/2009 | Liikanen et al. | 711/162 |
| 7,617,358 B1 | * | 11/2009 | Liikanen et al. | 711/112 |
| 8,223,448 B1 | * | 7/2012 | Haw et al. | 360/46 |
| 2002/0114244 A1 | * | 8/2002 | Kelly et al. | 369/53.37 |
| 2003/0112541 A1 | * | 6/2003 | Lee et al. | 360/55 |
| 2003/0156343 A1 | * | 8/2003 | Freitas et al. | 360/46 |
| 2005/0099717 A1 | * | 5/2005 | Flynn et al. | 360/51 |
| 2007/0195446 A1 | | 8/2007 | Yun | |
| 2010/0246048 A1 | | 9/2010 | Ranmuthu | |
| 2011/0038071 A1 | | 2/2011 | Kim et al. | |
| 2013/0250450 A1 | * | 9/2013 | Riley et al. | 360/75 |

OTHER PUBLICATIONS

Veenstra et al., "A 1GB/s Read/Write Pramplifier for Hard-Disk-Drive Applications", IEEE ISSCC 2001 Digest, 11 pages.

* cited by examiner

*Primary Examiner* — Peter Vincent Agustin
(74) *Attorney, Agent, or Firm* — Hollingsworth Davis, LLC

(57) ABSTRACT

Approaches described in this disclosure are generally directed to methods and devices for delaying a write turn-on of a memory device. A write control signal from a memory controller to a preamplifier of a storage device is asserted. A warm-up interval of write drivers of the preamplifier is initiated, the warm-up interval having a duration of predetermined length. Data is transmitted to the write drivers during the warm-up interval.

19 Claims, 6 Drawing Sheets

DELAYED DISK DRIVE PREAMPLIFIER WRITE TURN ON

SUMMARY

Various embodiments described in this disclosure are generally directed to methods and devices for delaying a write turn-on of a memory device. According to various embodiments, a method includes asserting a write control signal from a memory controller to a preamplifier of a storage device. A warm-up interval of write drivers of the preamplifier is initiated, the warm-up interval having a duration of predetermined length. Data is transmitted to the write drivers during the warm-up interval.

According to some aspects, write current is applied from the write drivers to a writer of the storage device in response to expiration of the warm-up interval. In some cases, the write current is substantially saturated when the write current is applied. According to various implementations, a read operation is continued during the warm-up interval. In some embodiments, the predetermined length of the warm-up interval allows for the write current to be substantially saturated upon expiration of the warm-up interval.

According to various implementations, the write control signal is shifted on time by the controller to account for the warm-up interval. In some cases, transmitting data to the write drivers comprises transmitting at least one of timing data and/or orienting data to the write drivers during the warm-up interval. In some implementations, a read control signal is already asserted at the time that the write control signal is asserted. According to some aspects, the read control signal is de-asserted in response to the expiration of the warm-up interval.

Some embodiments involve a preamplifier for a storage device. The preamplifier includes one or more write drivers configured to receive data from a memory controller and to provide write current to a writer to facilitate storage of the data in a storage medium. The preamplifier also includes write current delay circuitry, the write current delay circuitry configured to initiate a warm-up interval of predetermined length in response to receipt of a write control signal from the memory controller, wherein the write drivers receive the data from the memory controller during the warm-up interval.

According to various aspects, the storage medium is a magnetic storage medium. In some cases, the preamplifier includes reader circuitry configured to continue a read operation during the warm-up interval. In some implementations, the write drivers receive one or more of timing data and orienting data during the warm-up interval. According to various embodiments, the write current delay circuitry is further configured to apply the write current to a writer in response to expiration of the warm-up interval. According to some embodiments, the write current is substantially saturated when the write current is applied by the write current delay circuitry. According to various aspects, the preamplifier includes read circuitry configured to de-assert a read control signal in response to the expiration of the warm-up interval.

These and other features and aspects of various embodiments may be understood in view of the following detailed discussion and accompanying drawings.

DETAILED DESCRIPTION

Some memory devices need a period of time to transition from a read mode to a write mode to allow the write circuitry to warm-up in preparation for writing data. The warm-up interval may cause efficiency loss because of the time the memory device takes to transition between modes. During the warm-up interval, the write driver current used to write the data may not be fully saturated resulting in incomplete or missing transitions written to a storage media. These incomplete or missing transitions may cause errors when the memory device attempts to read the data at a later time, further decreasing the efficiency of the memory device. It may be useful to implement a warm-up delay that allows the write driver to warm-up before current is applied to the write head so that the write current is substantially saturated when data is written to the media. In some embodiments it may be useful to start the warm-up of the write driver at an earlier time so that a read operation is continued during at least a portion of the warm-up of the write driver.

Figure 1:
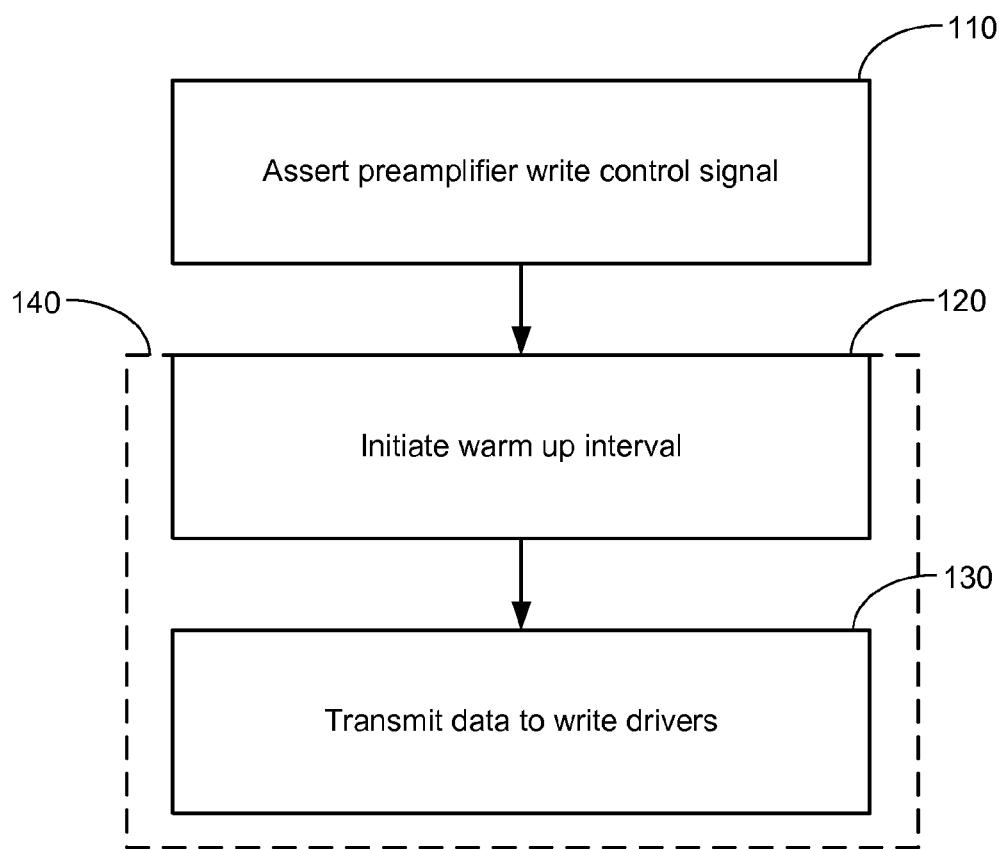
FIG. 1 a flow diagram that illustrates a process capable of performing a delayed write start in accordance with some embodiments.

FIG. 1 illustrates a flow diagram in accordance with embodiments described herein. A write control signal from a memory controller to a preamplifier of a storage device is asserted 110. A warm-up interval 140 of write drivers of the preamplifier is initiated 120, wherein the warm-up interval 140 has a predetermined length. Data is transmitted 130 to the write drivers during the warm-up interval 140. In some cases, a write current is delayed until after or substantially the same time as the end of the warm-up interval 140. According to various embodiments, a read operation may continue throughout the warm-up interval 140 during a time at which the current is delayed and/or the assertion of a write control signal is moved back in time allowing for a read operation to continue during the warm-up interval 140 and until the write current is applied. The delay of the application of the write current may allow for the write current to be at full saturation once applied and thus prevents writing to the media without full write saturation.

Figure 2:
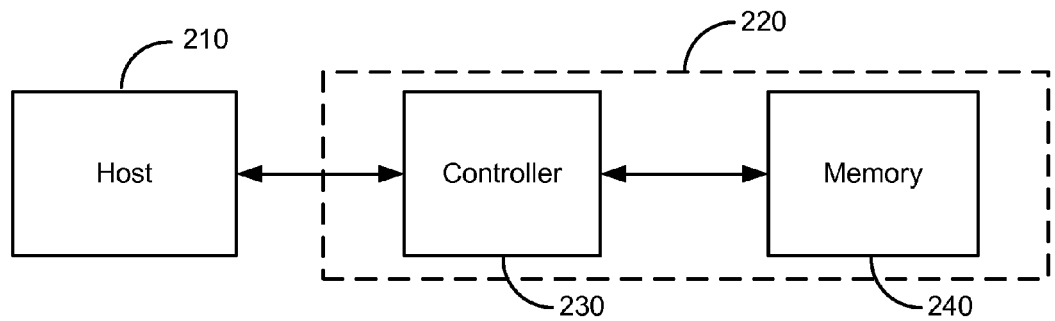
FIG. 2 is a block diagram of a computing system capable of performing a delayed write start.

FIG. 2 is a block diagram of a computing system capable of performing a delayed write start. FIG. 2 includes a host 210 and a memory device 220. The memory device 220 includes a controller 230 and memory 240. The host 214 may be any type of computing system. The controller 230 facilitates communication between the host 214 and the memory 240. The memory may be of various types, comprising magnetic media and/or hybrid drives that incorporate both magnetic media and solid state media.

The techniques and structures described herein may be used, for example in a magnetic data storage device such as magnetic hard drive. A hard drive generally includes at least one magnetic disk that rotates around a spindle axis. One or more transducer heads are positioned over the disk to read from or write to the disk. The one or more transducer heads may include both magnetic read and write heads. A preamplifier circuit may also be present and include write driver circuitry that is the current source for the heads. In some cases, the write current that is delivered to the transducer heads is not fully saturated and is in an indeterminate state when it is applied. Write current in an indeterminate state can cause data written to be misinterpreted by a read circuit of the memory device. The indeterminate write current state can also leave a period of direct current erasure (DC) on the media. In some cases, due to the way the sectors line up track to track, these DC write splices can line up coherently and cause a DC bias in the reader. The DC bias can cause a DC offset in the read back signal, resulting in data recovery errors and/or memory device efficiency loss.

Some embodiments discussed herein involve delaying the application of the write current to the write heads until after a warm-up interval. Delaying the application of the write current can help to avoid efficiency loss and/or periods of DC on the media that may result in read errors. Waiting to apply current until after a warm-up interval helps to prevent write current that is not fully saturated from being applied to the head. According to embodiments described herein, the warm-up interval can be implemented by the preamplifier as shown in the block diagram of FIG. 3.

Figure 3:
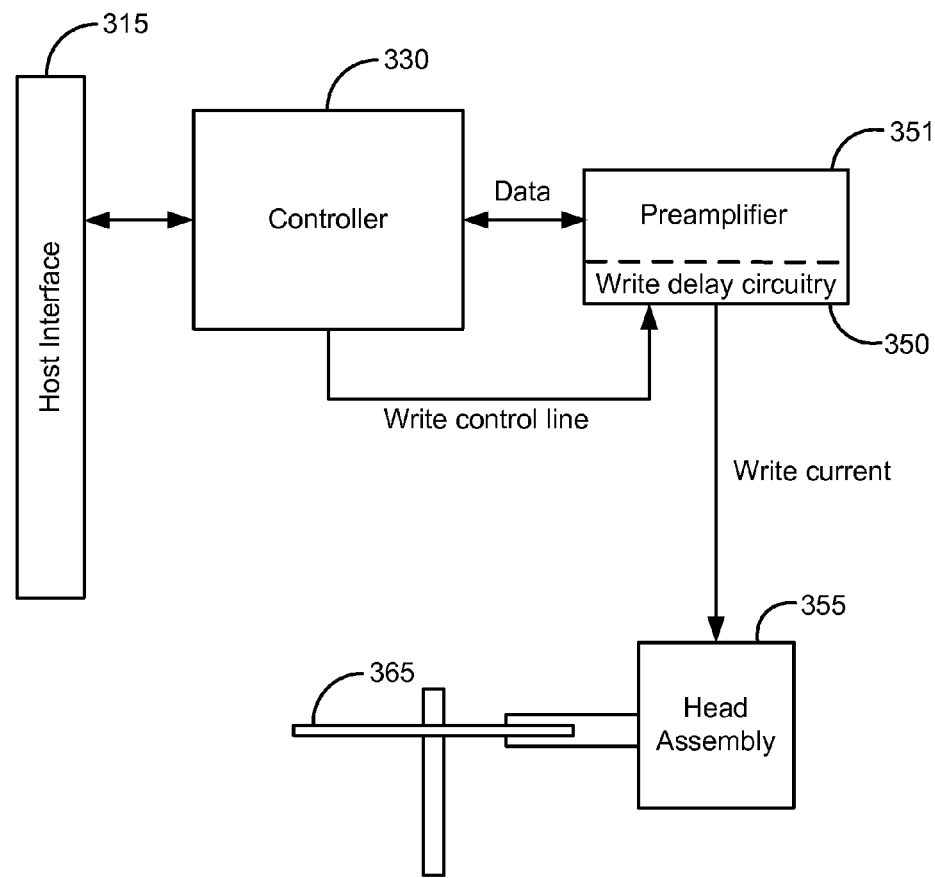
FIG. 3 is a block diagram illustrating a system capable of performing a delayed write start according to some embodiments.

FIG. 3 illustrates a more detailed block diagram in accordance with embodiments described herein. The controller 330 for the memory device receives read and write requests from a host via a host interface 315. In this scenario, the controller 330 for the memory device provides a write control signal that, when asserted, indicates the start of a write mode or a transition between a read mode and a write mode. When a write request is received by the controller, the controller transmits data to the preamplifier 351 and also transmits a write control line to the preamplifier 351. The write control line causes the preamplifier 351 to activate a warm-up interval of the write circuitry via write delay circuitry 350 located in the preamplifier 351, the warm-up interval having a set length. Upon expiration of the warm-up interval, write current is applied to the head assembly 355 causing data to be written to the media 365.

Figure 4A:
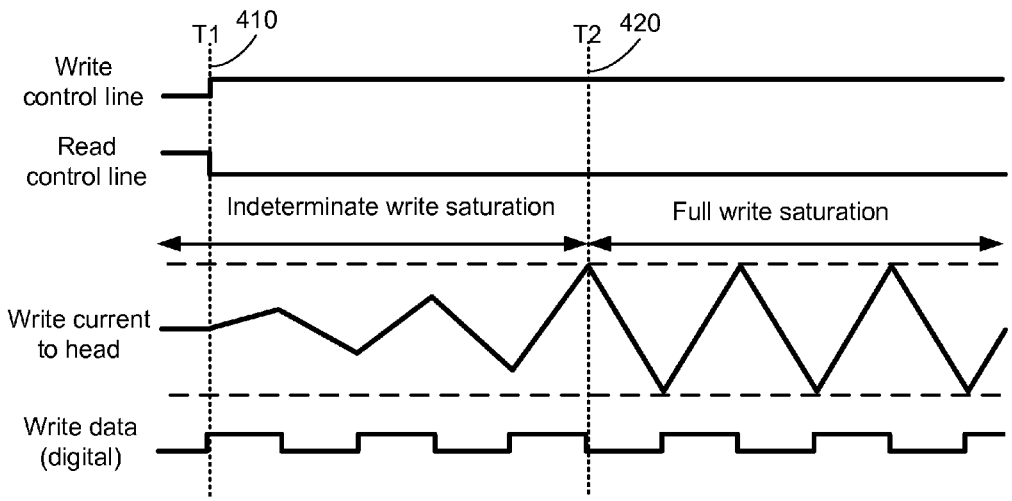
FIGS. 4A and 4B show timing diagrams for a system without a delayed write start and with a delayed write start.
Figure 4B:
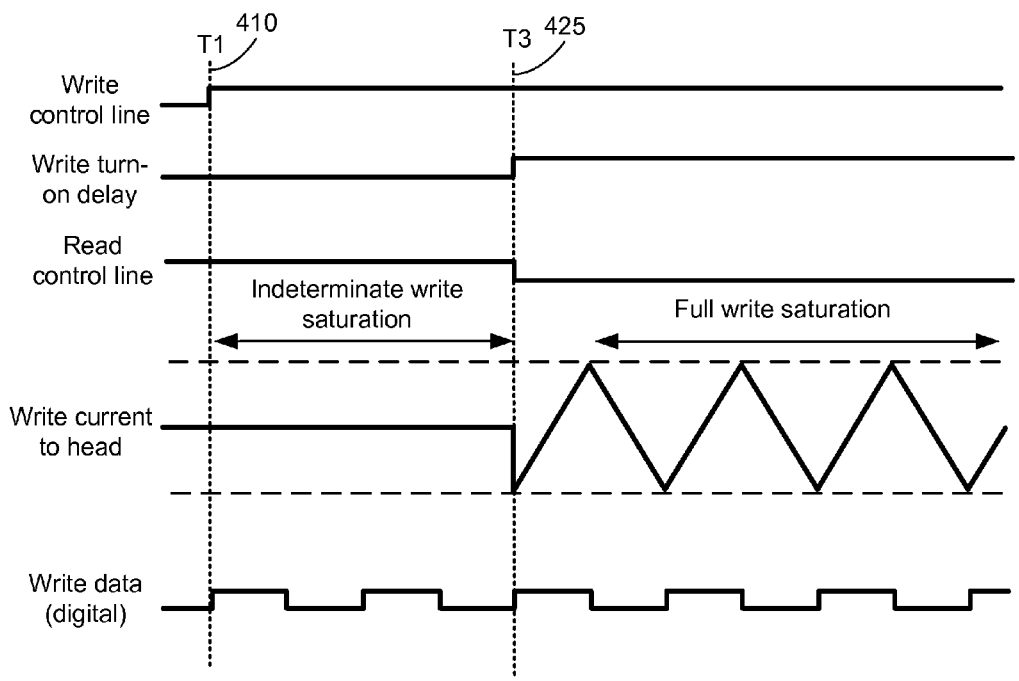

FIGS. 4A-4B are timing diagrams that illustrate a transition from a read mode to a write mode in conjunction with FIG. 3. FIG. 4A illustrates a timing diagram example in which no delay is implemented at the preamplifier 451. According to FIG. 4A the write control line is asserted at time T1 410 during a read mode of the memory device. The assertion of the write control line ends the read mode so that data can be written to the memory device. As can be seen from FIG. 4A, the read control line is de-asserted upon the assertion of the write control line at time T1 410. Transmission of digital data to the preamplifier 451 starts once the write control line is asserted. The assertion of the write control line also causes write current to be applied to the write head corresponding to the write data. The write circuitry continues to warm-up until the write current reaches full saturation at time T2 420. Data is still written to the media during this warm-up process as is shown, despite the indeterminate saturation of the write current during the warm-up period. To compensate for the period of indeterminate write saturation, extra padding is written to the disk that does not contain usable data. The added padding results in format efficiency loss. As previously discussed, writing data to the media during the indeterminate write saturation period may also create a period of DC on the media due to the amplitude being below a threshold. This can result in read errors in a later read operation of the memory device which may further decrease efficiency. Time may also be added to the beginning of a write command in order to account for warming up the write circuitry, which also decreases the efficiency of the transition.

FIG. 4B illustrates an example embodiment in which a warm-up interval is implemented via the write delay circuitry 450. The write control line is asserted at time T1 410. As can be observed from FIG. 4B, the read control line may not be de-asserted upon the assertion of the write control line as in FIG. 4A. The assertion of the write control line causes digital data to be sent to the preamplifier as in FIG. 4A. The digital data may be timing and/or orienting data, for example. In some cases, the digital data may comprise a servo pattern. A write turn-on delay is implemented in the preamplifier that prevents current from being applied to the write head until the expiration of the write circuitry warm-up interval at time T3 425. The delay of the application of the current to the write head allows a read operation to be continued until current is applied to the head. In the example of FIG. 4B, the read control line is not de-asserted until the completion of the write-turn on delay. Asserting the read control allows the read operation to continue while the write circuitry is warming-up. In some cases, no read operation takes place during the write turn-on delay. The write control line may be asserted at an earlier time such that the completion of the warm-up delay is the old write start time. Time T3 425 may be the same time or a different time as that time needed for the current to reach full saturation at time T2 420. The current is applied to the write heads starting at time T3 425. The delay of the write current also allows a read operation to continue until write current is applied at time T3 425. Allowing a read operation to continue during a warm-up interval of the write circuitry may result in greater efficiency of the memory device. In various embodiments discussed herein, the warm-up interval is a predetermined time. For example, the predetermined time may be a maximum amount of time that a write circuit takes to warm-up. In some cases, the predetermined time may be set based on an average time a write circuit takes to warm-up.

Figure 5:
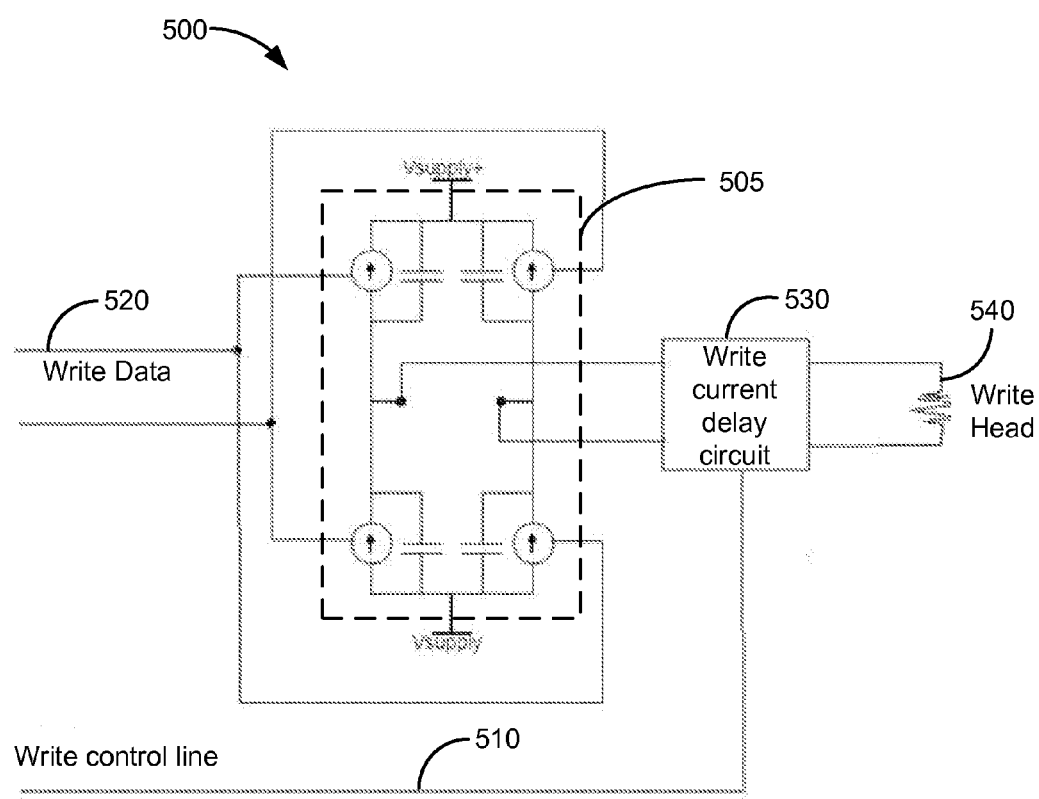
FIG. 5 is a circuit diagram illustrating write circuitry of a memory device according to some embodiments.

FIG. 5 shows in more detail a diagram of a memory device preamplifier circuit 500. The preamplifier includes write driver circuitry 505 configured to generate the write current to be applied to the write head 540. FIG. 5 depicts the write control line 510 from the controller which initiates the start of a warm-up interval for the current drivers of the write drive circuitry of the preamplifier. For example, the write control line 510 starts a timer in the write current delay circuit 530. Data 520 may be transmitted to the preamplifier 500 and/or to the heads 540 throughout the write warm-up process.

Figure 6:
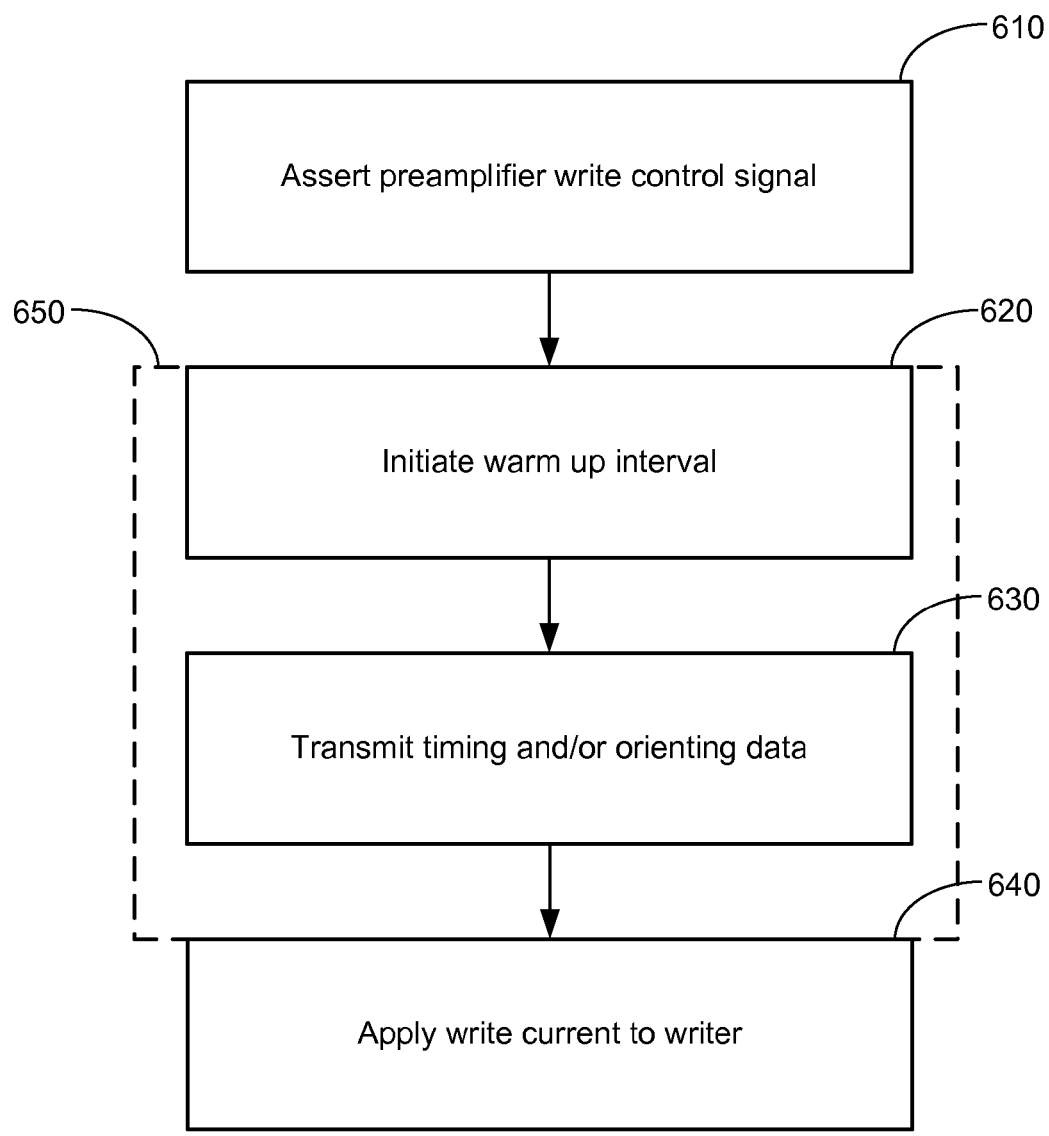
FIG. 6 is a flow diagram for implementing a delayed write start in accordance with various embodiments.

FIG. 6 illustrates a flow diagram in accordance with embodiments disclosed herein. A write control signal from a memory controller is asserted 610 to a preamplifier of a memory device. A warm-up interval 650 of predetermined length of write drivers of the preamplifier is initiated 620. Timing and/or orienting data is transmitted 630 to the write drivers during the warm-up interval 650. Write current is applied 640 by the write drivers to a writer of the storage device in response to expiration of the warm-up interval 650.

Figure 7:
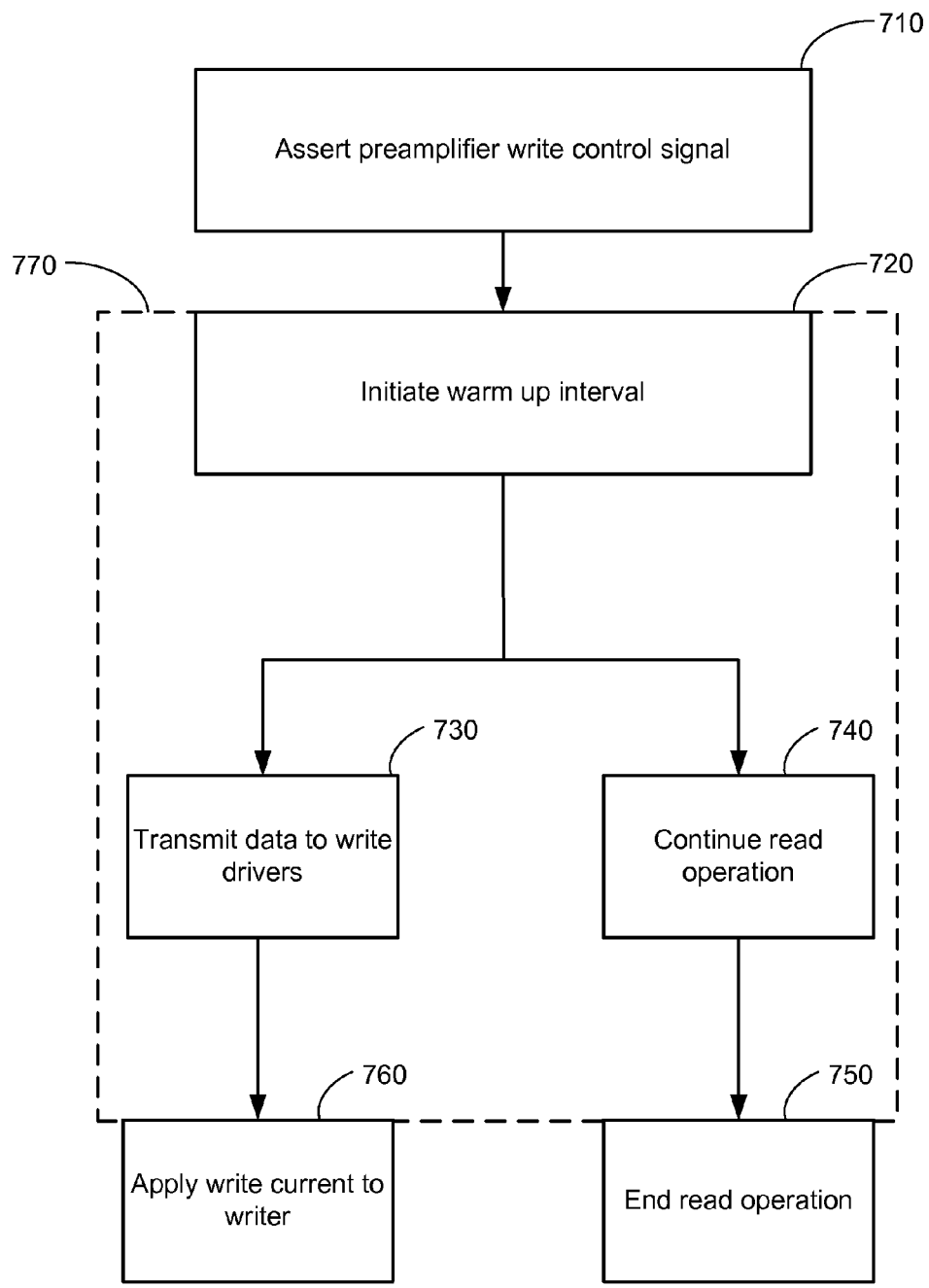
FIG. 7 is a flow diagram that illustrates a process for delaying a write start of a memory device according to some embodiments.

FIG. 7 illustrates a more detailed flow diagram in accordance with various embodiments. A write control signal is asserted 710 from a memory controller to a preamplifier of a memory device. In response to the assertion of the write control signal, a warm-up interval 770, having a predetermined length, of the write drivers of the preamplifier is initiated 720. Data is transmitted 730 to the write circuitry during the warm-up interval 770. In some cases, the data is transmitted throughout the duration of the warm-up interval 770. According to various embodiments, the transmitted data is timing and/or orientation data. A read operation is continued 740 during the warm-up interval 770. Upon expiration of the warm-up interval 770 the read operation is ended 750 and write current is applied 760 to a writer of the storage device.

It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. A method, comprising:
    asserting a write control signal from a memory controller to a preamplifier of a storage device;
    initiating a warm-up interval of write drivers of the preamplifier, the warm-up interval having a duration of predetermined length;
    transmitting timing data to the write drivers during the warm-up interval; and
    applying the write current from the write drivers to a writer of the storage device after expiration of the warm-up interval.

2. The method of claim 1, wherein the write current is substantially saturated when the write current is applied.

3. The method of claim 1 further comprising continuing a read operation during the warm-up interval.

4. The method of claim 1, wherein the predetermined length of the warm-up interval allows for the write current to be substantially saturated upon expiration of the warm-up interval.

5. The method of claim 1, wherein the write control signal is shifted in time by the controller to account for the warm-up interval.

6. The method of claim 1, wherein transmitting data to the write drivers further comprises transmitting at least one of timing data and orienting data to the write drivers during the warm-up interval.

7. The method of claim 1, wherein a read control signal is already asserted at the time that the write control signal is asserted.

8. The method of claim 7, wherein the read control signal is de-asserted after the expiration of the warm-up interval.

9. A method, comprising:
    asserting a write control signal from a memory controller to a preamplifier of a storage device;
    initiating a warm-up interval of write drivers of the preamplifier, the warm-up interval having a duration of predetermined length;
    transmitting orienting data to the write drivers during the warm-up interval; and
    applying the write current from the write drivers to a writer of the storage device after expiration of the warm-up interval.

10. The method of claim 9, further comprising continuing a read operation during the warm-up interval.

11. The method of claim 9, wherein the predetermined length of the warm-up interval allows for the write current to be substantially saturated upon expiration of the warm-up interval.

12. A storage device, comprising:
    one or more write drivers configured to receive data from a memory controller and to provide write current to a writer to facilitate storage of the data in a storage medium; and
    write current delay circuitry, the write current delay circuitry configured to initiate a warm-up interval of predetermined length after receipt of a write control signal from the memory controller, wherein the write drivers receive at least one of timing data and orienting data from the memory controller during the warm-up interval.

13. The device of claim 12, wherein the storage medium is a magnetic storage medium.

14. The device of claim 12, further comprising reader circuitry configured to continue a read operation during the warm-up interval.

15. The device of claim 12, wherein the write drivers receive one or more of timing data and orienting data during the warm-up interval.

16. The device of claim 12, wherein the write current delay circuitry is further configured to apply the write current to a writer after expiration of the warm-up interval.

17. The device of claim 16, wherein the write current is substantially saturated when the write current is applied by the write current delay circuitry.

18. The device of claim 12, further comprising read circuitry configured to de-assert a read control signal after the expiration of the warm-up interval.

19. The device of claim 12, wherein a delay between a first time when the warm up interval begins and a second time when the write current is applied prevents an indeterminate write saturation of the storage medium in the interval therebetween such that format efficiency is increased.

* * * * *